(12) United States Patent
Diogene et al.

(10) Patent No.: US 10,808,766 B2
(45) Date of Patent: Oct. 20, 2020

(54) H-SEAL MOUNTING TOOL

(71) Applicant: Aktiebolaget SKF, Gothenburg (SE)

(72) Inventors: Jean-Marc Diogene, Saint-Germain de Modéon (FR); Damien Bredoire, Auxerre (FR); Michel Nicolas, Annay la Côte (FR)

(73) Assignee: Aktiebolaget SKF, Gothenburg (SE)

( * ) Notice: Subject to any disclaimer, the term of this patent is extended or adjusted under 35 U.S.C. 154(b) by 105 days.

(21) Appl. No.: 16/031,009

(22) Filed: Jul. 10, 2018

(65) Prior Publication Data

US 2019/0032721 A1 Jan. 31, 2019

Related U.S. Application Data

(60) Provisional application No. 62/539,311, filed on Jul. 31, 2017.

(51) Int. Cl.
  *F16C 43/04* (2006.01)
  *B25B 27/00* (2006.01)
  *F16C 33/78* (2006.01)

(52) U.S. Cl.
  CPC ........ *F16C 43/045* (2013.01); *B25B 27/0028* (2013.01); *F16C 33/7836* (2013.01)

(58) Field of Classification Search
  CPC . B25B 27/0028; B25B 27/0092; B25B 27/06; F16C 43/00; F16C 43/045
  See application file for complete search history.

(56) References Cited

U.S. PATENT DOCUMENTS

| | | | | |
|---|---|---|---|---|
| 2,068,035 A | * | 1/1937 | Meyer | E01C 23/0986 428/174 |
| 2,761,199 A | * | 9/1956 | Allen | E04F 21/0038 29/235 |
| 3,307,249 A | * | 3/1967 | Hohoff | B25B 27/0092 29/235 |
| 3,439,406 A | * | 4/1969 | Wallin | B21D 39/03 277/316 |
| 3,550,242 A | | 12/1970 | Sarvay | |
| 4,169,305 A | * | 10/1979 | Kruszona | B25B 27/0092 29/235 |

(Continued)

FOREIGN PATENT DOCUMENTS

EP 3115157 A1 1/2017

*Primary Examiner* — Tyrone V Hall, Jr.
(74) *Attorney, Agent, or Firm* — Garcia-Zamor Intellectual Property Law; Ruy Garcia-Zamor; Bryan Peckjian

(57) ABSTRACT

A tool for inserting an H-Seal in a bearing includes a vertical part assembly having a top portion, a bottom portion, and a freely rolling disc. A first interconnecting portion is configured to engage a second interconnecting portion, the first interconnecting portion configured to receive the vertical part assembly through an opening in the first interconnecting portion. A gripping element connected to the top portion. A rolling disc mounted to the bottom portion of the vertical part assembly. First and second sliding pads having first and second evolutive guides that vary in shape from top to bottom and from back to front. The evolutive guides are configured to pass the H-Seal between the stages of being in a free state with lower lips opened outward, to pre-inserted into the bearing, to inserted into the bearing, to coming down into the bearing, to the lower lips opening outward.

10 Claims, 7 Drawing Sheets

(56) References Cited

U.S. PATENT DOCUMENTS

| | | | |
|---|---|---|---|
| 4,199,852 A * | 4/1980 | Ayers | B25B 27/0035 |
| | | | 29/239 |
| 5,045,146 A * | 9/1991 | Rundo | B25B 27/0092 |
| | | | 156/391 |
| 9,404,581 B1 | 8/2016 | Robinson | |
| 2002/0163137 A1 | 11/2002 | Esumi | |
| 2011/0219600 A1 * | 9/2011 | Silliman | B23P 19/047 |
| | | | 29/428 |

* cited by examiner

H-SEAL MOUNTING TOOL

CROSS-REFERENCE

This application claims the benefit of U.S. Provisional Application 62/539,311, filed on Jul. 31, 2017, the contents of which is herein incorporated by reference in its entirety.

TECHNOLOGICAL FIELD

A tool for inserting a seal in a bearing. In particular, a tool having evolutive guides for inserting an H-Seal in a large diameter bearing.

SUMMARY

According to one or more embodiments a tool for inserting an H-Seal into a bearing is provided. The H-Seal has two upper lips, two lower lips and a vertical flange positioned therebetween that connects the upper and lower lips together, the bearing having inner and outer rings and a gap therebetween.

According to a first aspect of the invention the tool provides a vertical part assembly having a top portion, a bottom portion, and a freely rolling disc, the top portion having right and left side portions, a first interconnecting portion configured to engage a second interconnecting portion, the first interconnecting portion configured to receive the vertical part assembly through an opening in the first interconnecting portion that compliments the shape of the top and bottom portions of the vertical part assembly, a gripping element connected to the top portion of the vertical part assembly body, the rolling disk providing a cylindrical hole positioned about a center axis, the rolling disc mounted to the bottom portion of the vertical part assembly and fixed through the annular hole to the bottom end of the vertical part assembly, first and second sliding pads connected to the right and left interconnecting portions of vertical part assembly, the first and second sliding pads having first and second evolutive guides that vary in shape from top to bottom and from back to front, wherein the first and second evolutive guides are configured to pass the H-Seal between the stages of being in a free state with the lower lips opened outward, to being pre-inserted into the bearing, to being inserted into the bearing, to coming down into the bearing, to the lower lips opening downward in a vertical position between the inner and outer bearing rings, and finally, the two lower lips being able to recover into their initial shape opened outward.

In a second aspect of the present invention the tool includes an adapter that connects the gripping element to the top portion of the vertical part assembly.

In a third aspect of the present invention the rolling disc is one of riveted or pinned to the cylindrical hole in the bottom end of the vertical part assembly.

In another aspect of the present invention the left and right interconnecting portions of the body are configured to be male and female interconnecting portions respectively.

In another aspect of the present invention the tool provides a male interconnecting assembly including a first lever having a threaded end, a first spring, a first locating pin, and the male interconnecting portion that provides at least one threaded hole and at least one clearance hole disposed therein, and a female interconnecting assembly including a second lever having a threaded end, a second spring, a second locating pin, and the female interconnecting portion providing at least one threaded hole and at least one clearance hole disposed therein, wherein the first locating pin is fixed to the male interconnecting assembly and the second locating pin is fixed to female interconnecting assembly, wherein the male and female interconnecting assemblies are assembled together such that the first locating pin projects and is guided into one of the at least one clearance holes in the female interconnecting assembly and the second locating pin projects and is guided into one of the at least one clearance holes disposed within the male interconnecting assembly, and wherein the first lever extends through one of the at least one clearance holes in the male interconnecting assembly and screws into one of the at least one threaded holes in the female interconnecting assembly and the second lever extends through one of the at least one clearance holes in the female interconnecting assembly and screws into one of the at least one threaded holes in the male interconnecting assembly.

In another aspect of the present invention the first spring is positioned within one of the at least one clearance holes disposed within the male interconnecting assembly, wherein the second spring is positioned within one of the at least one clearance holes disposed within the female interconnecting assembly, and wherein as the first lever and second levers are further tightened into one of the at least one threaded holes in the male and/or female interconnecting assemblies respectively, the first and second springs compress and provide a force that opposes the tightening.

In another aspect of the present invention is adjustable in order to insert the seal in a slide channel of the bearing in order to keep the seal in an Y shape by forming the two lower lips close together.

In another aspect of the present invention upon insertion of the H-Seal, an optimal position of the roller with respect to horizontal is tangent to the top of the H-Seal.

In another aspect of the present invention the seal is inserted in the gap between the inner and the outer rings of the bearing, and wherein the gap between the sliding pads is optimized to help an insertion zipper effect with a low friction.

In a final aspect of the present invention the sliding pads move in a groove that enables adjustment of their position forward or backward with respect to a center of the tool.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
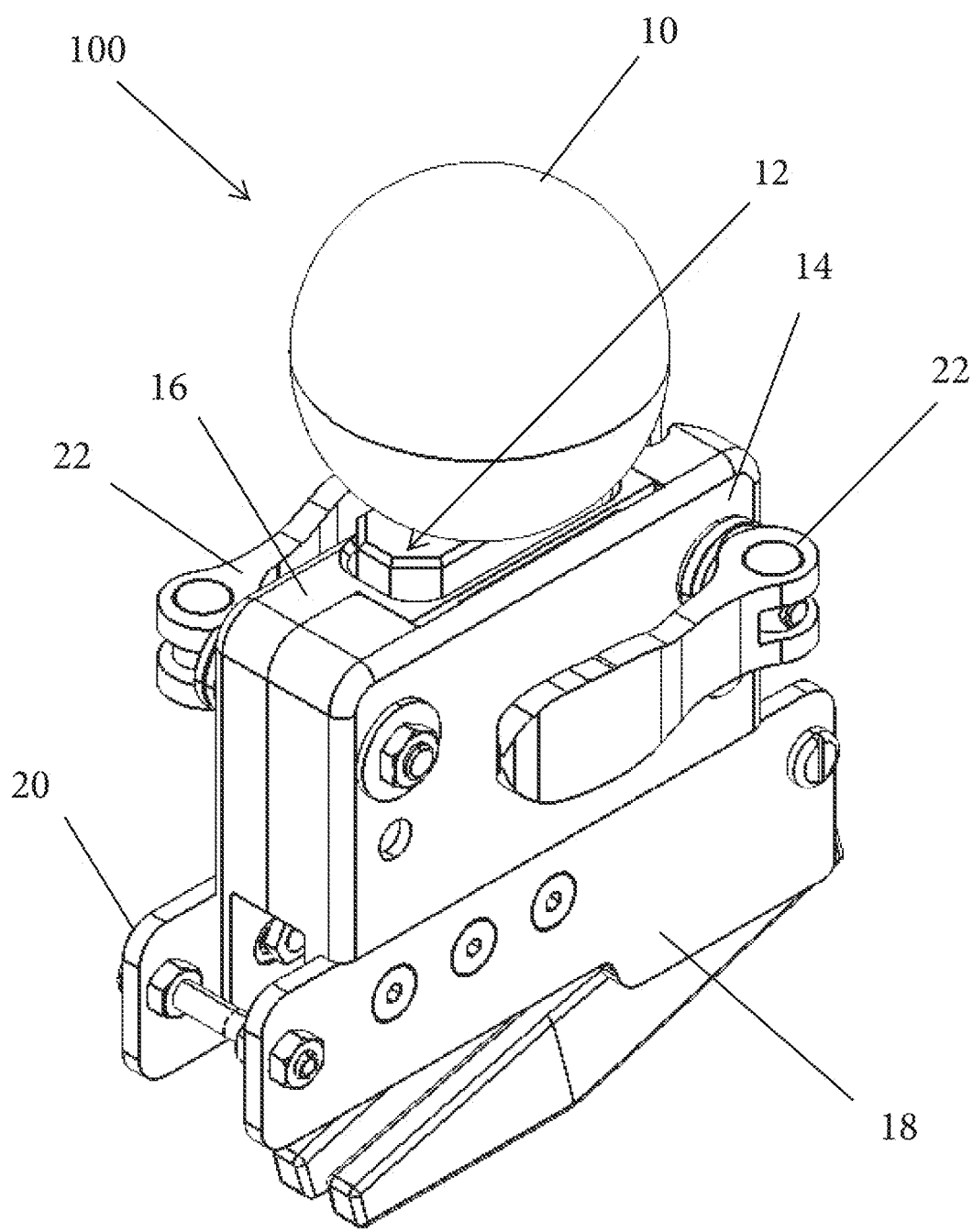
FIG. 1 shows an elevated perspective view of the insertion tool taken from the right side according to the present invention.

For purposes of description herein, the terms "inward," "outward," "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
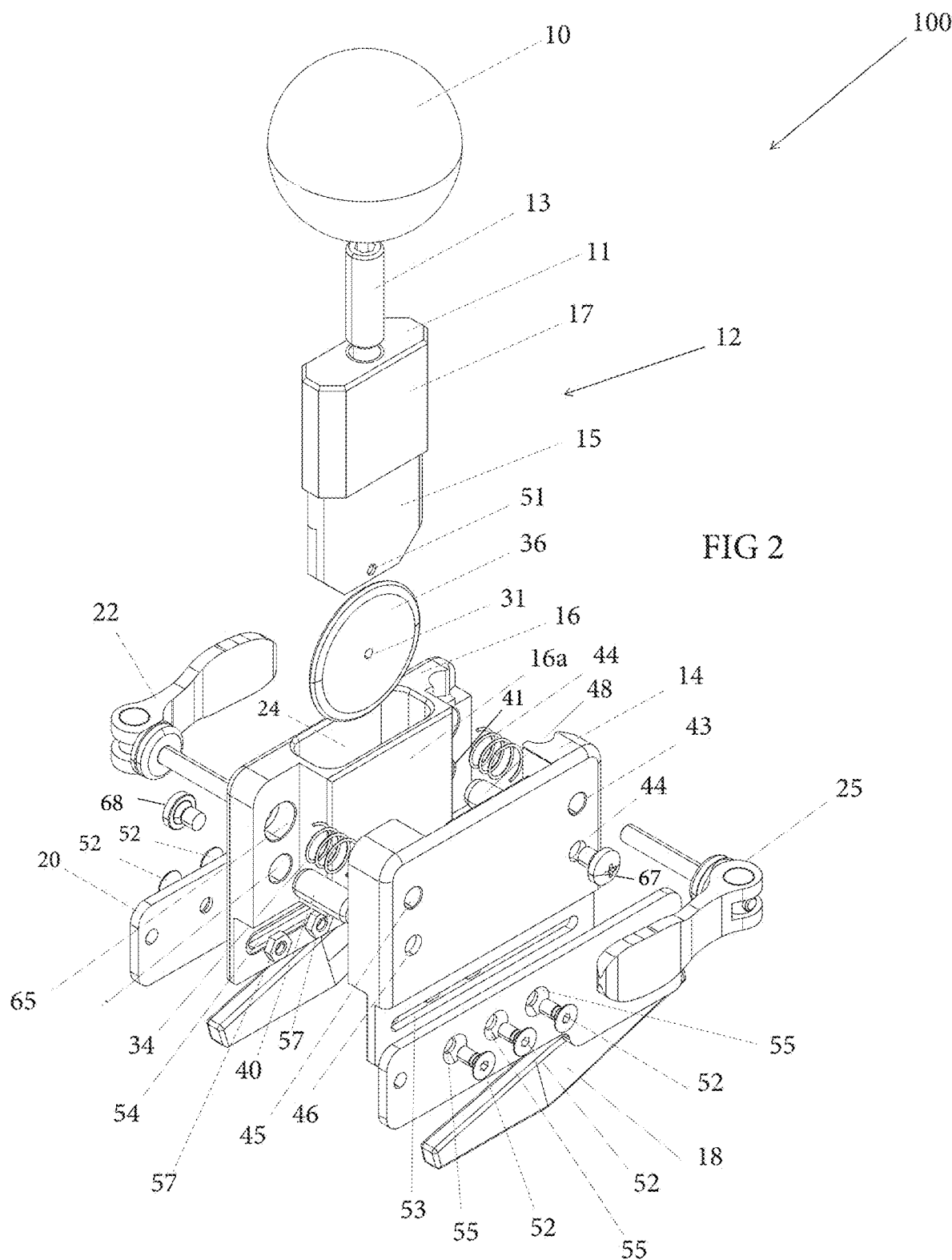
FIG. 2 shows an exploded perspective view of the insertion tool taken from the right side according to the present invention.
Figure 3:
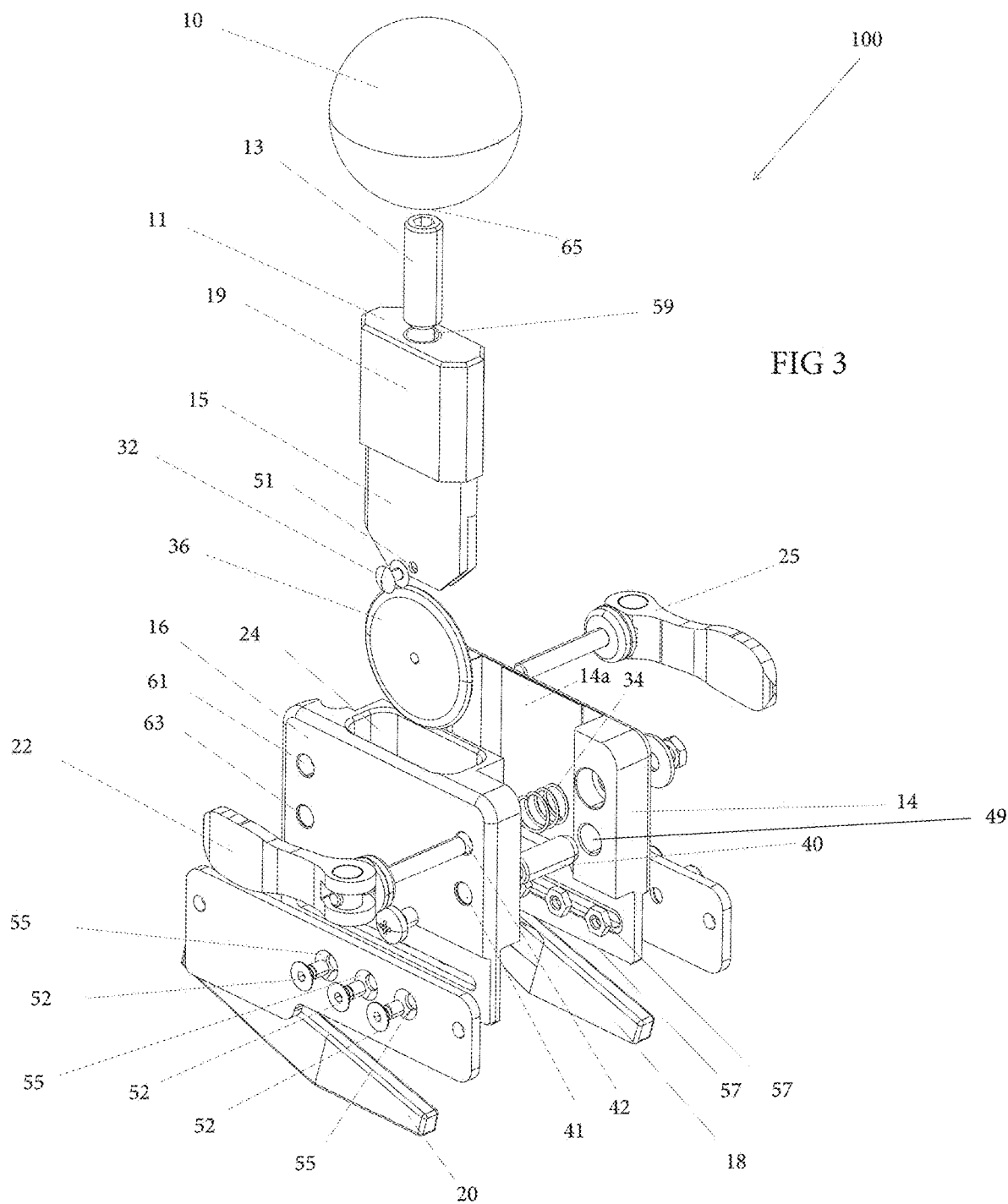
FIG. 3 shows an exploded perspective view of the insertion tool taken from the left side according to the present invention.

A tool assembly 100 for inserting an H-Seal HS in a bearing is first illustrated in FIGS. 1, 2 and 3. The tool assembly 100 includes a vertical part assembly 12, a left interconnecting assembly 16 and a right interconnecting assembly 14. The vertical part assembly 12 provides a top portion 11, a bottom portion 15, and a freely rolling disc 36. The top portion 11 further includes right and left side portions 17, 19.

The left interconnecting portion 14 is configured to engage and mate with the right interconnecting portion 16. The right interconnecting portion 16 is configured to receive the vertical part assembly 12 down through a slot 24 in the second interconnecting portion 16. The slot 24 could be any shape for purposes of the invention. Here in the present embodiment, the slot 24 is shown as being mostly rectangular in shape.

The slot 24 is configured to compliment the shape of the top portion 11 of the vertical part assembly 12. During assembly, a close sliding fit is obtained between the top portion 11 of the vertical part assembly 12 and the slot 24 of the second interconnecting portion 16 when the vertical part assembly 12 is inserted down through the slot 24. The close sliding fit provides enough clearance for the accurate location of the top portion 11 into the slot 12 such that that there is no noticeable play between the two. The close sliding fit enables the freely rolling disc 36 to maintain a downward pressure on the top of the H-Seal. See FIG. 7.

The right and left interconnecting portions 14, 16 of the body are further configured to provide complimentary mating female 14a and male 16a portions respectively. That is, when the right and left interconnecting portions 14, 16 of the body are assembled inward towards each other the complimentary mating female 14a and male 16a portions meet together to become unitized as shown in FIG. 1.

The tool assembly 100 provides a first cam locking lever 22 that has a threaded end, a first spring 34 that fits over the threaded end of the first cam locking lever 22, and a first locating pin 40. The tool assembly 100 further provides a second cam locking lever 25 that has a threaded end, a second spring 44 that fits over the threaded end of the second cam locking lever, and a second locating pin 48.

The first cam locking lever 22 is configured to fit through a clearance hole 42 in the left interconnecting portion 16. The threaded end of the lever 22 is configured to screw into a threaded hole 45 in the right interconnecting portion 14. The first spring 34 is inserted over the threaded end of the first locking lever 22 and rests within a recess 65 that encompasses clearance hole 42.

The second cam locking lever 25 is configured to fit through a clearance hole 43 in the right interconnecting portion 14. The threaded end of the lever 25 is configured to screw into a threaded hole 61 in the left interconnecting portion 16. The second spring 44 is inserted over the threaded end of the second locking lever 25 and rests within a recess (not shown) that encompasses clearance hole 43. The present configuration is symmetrical with the configuration described above in connection with the left interconnecting portion 16.

The first locating pin 40 is inserted into the right or female interconnecting portion 14 by way of a sliding fit and the second locating pin 48 is inserted into the left or male interconnecting portion 16 also by way of a sliding fit. The female and male interconnecting portions 14, 16 are slidingly assembled together such that the first locating pin 40 projects and is guided into clearance hole 49 disposed within the female interconnecting portion. Conversely, the second locating pin 48 projects and is guided into the clearance hole 41 disposed within the male interconnecting portion. Screws 67, 68 respectively secure the pins 48, 40 to the female and male interconnecting portions 14, 16.

A gripping element 10 is connected to the top portion 11 of the vertical part assembly body 12. The gripping portion provides a handle or grip for moving the tool within the gap as the H-Seal is installed. The tool may further include an adapter 13 that connects the gripping element 10 to the top portion 11 of the vertical part assembly 12 at a bottom end. In this embodiment, the adapter 13 is mounted to the top portion 11 through a hole 59 by way of being press fit. Similarly, the adapter 13 may be mounted by way of a press fit to the gripping element 10 through a hole 65 disposed in a bottom end of the gripping element 10.

The rolling disk provides an annular hole 31 positioned about its center. The rolling disc is mounted to the bottom portion 15 of the vertical part assembly 12 and fixed through an annular hole 51 to the bottom end 15 of the vertical part assembly 12. The rolling disc 36 can be attached to the bottom end 15 of the vertical part assembly 12 in any way that allows the roller to roll freely but still be fixed to the tool. As such, the roller may be riveted or pinned 32 to the cylindrical hole 31 in the bottom end 15 of the vertical part assembly 12.

Figure 4:
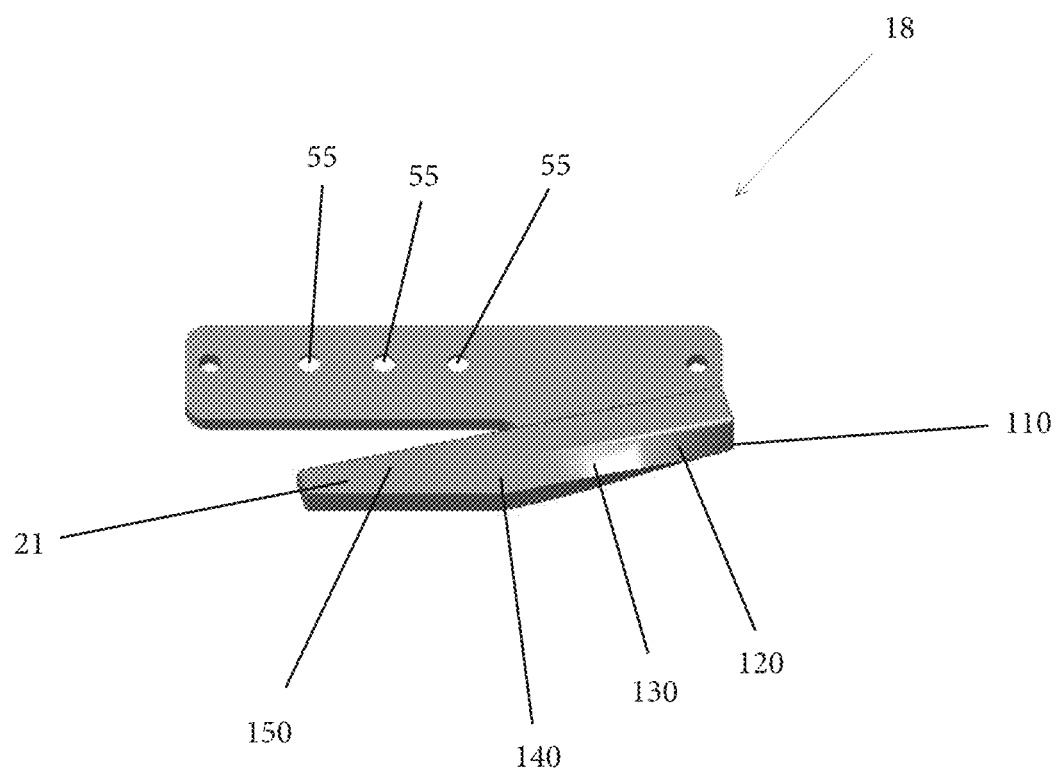
FIG. 4 shows an elevated perspective view of a right evolutive guide according to the insertion tool of the present invention
Figure 5:
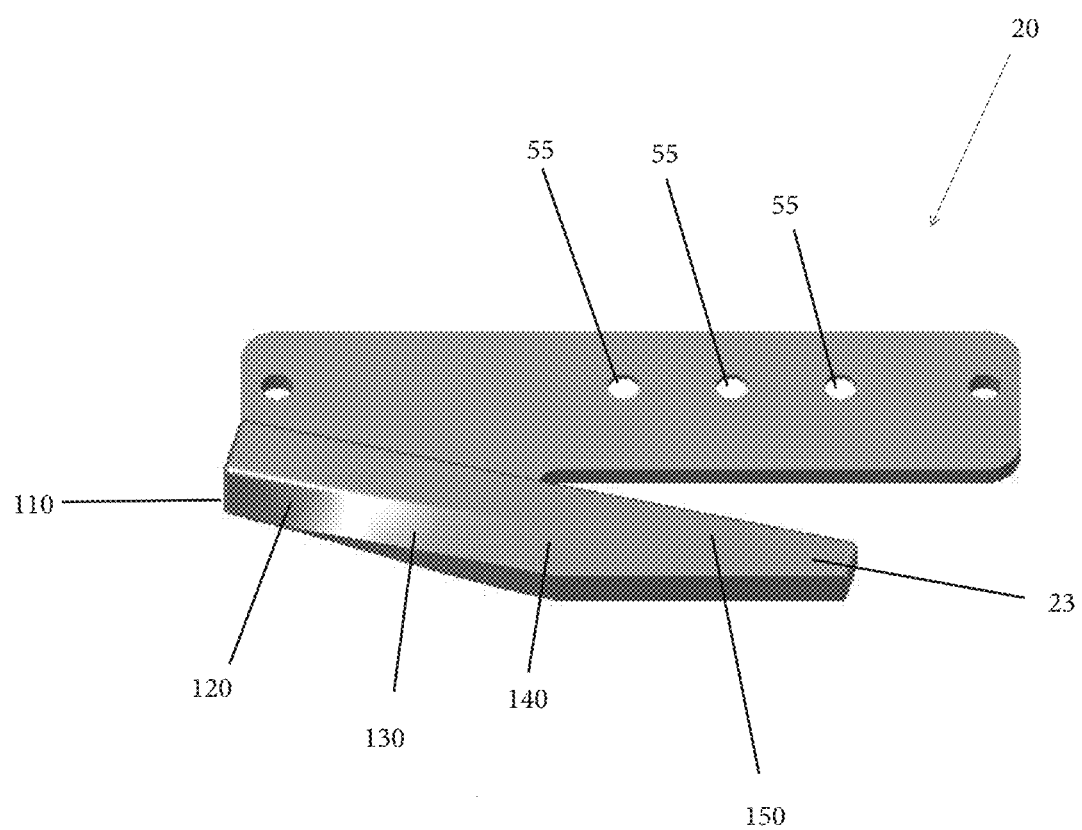
FIG. 5 shows an elevated perspective view of a left evolutive guide according to the insertion tool of the present invention.

First and second sliding pads 18, 20 are shown in FIGS. 4-5. The first and second sliding pads 18, 20 are connected to the right and left interconnecting portions 14, 16. The first and second sliding pads 18, 20 have first and second evolutive guides 21, 23 that vary in shape from top to bottom and from back to front. The function of the evaluate guides will be explained hereafter.

Figure 6:
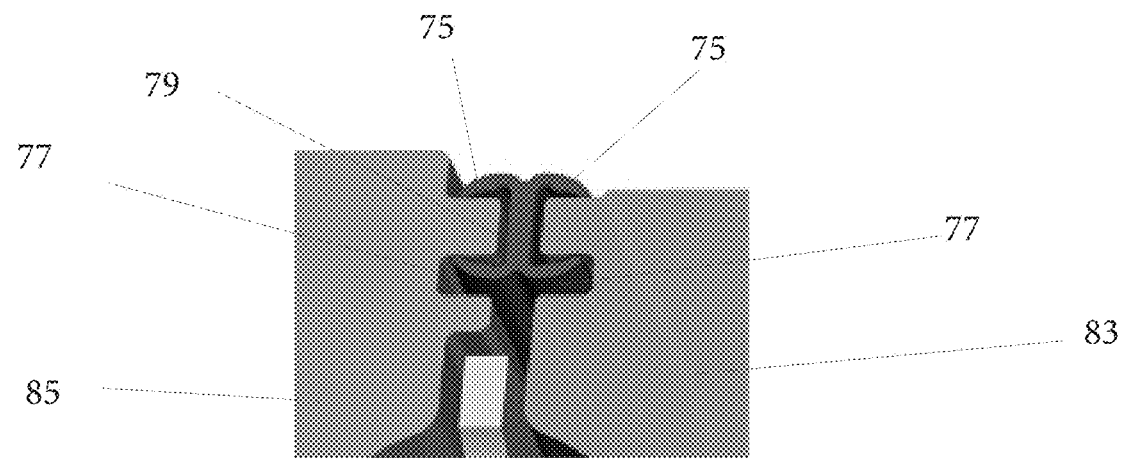
FIG. 6 shows an elevated cross-sectional view of the H-Seal installed into a bearing having used the insertion tool according to the present invention.

As shown in FIG. 6, the H-Seal has two upper lips 75, two lower lips 77 and a vertical flange 79 positioned therebetween that secures the upper and lower lips together. The bearing has inner 83 and outer 85 rings and a gap therebetween as illustrated as such.

The first and second evolutive guides 21, 23 are configured to pass the H-Seal between the stages of being in a free state with the lower lips 77 opened outward, to being pre-inserted into the bearing, to being inserted into the bearing, to coming down into the bearing, to the lower lips 77 opening downward in a vertical position (T-Shape) between the inner and outer bearing rings, and finally, the two lower lips 77 being able to recover into their initial shape opened outward.

FIGS. 4-5 show the stages of evolution of the first and second evolutive guides:

Initially, as the H-Seal is fed through the tool and proceeds in a circular path around the bearing, the seal first makes contact with a leading edge 110 of the guide. At this point, the lower lips 77 of the H-Seal are being pre-inserted into the bearing.

As the seal continues to pass through the tool and on its circular path the seal encounters a 1st stage 120 of the evolutive guide. Here, the lower lips 77 of the seal are initially formed together in order to be inserted into the bearing.

As the seal continues to pass through the tool on its path the seal encounters a 2nd stage 130 of the evolutive guide. Here, the lower lips 77 of the seal are being further formed together to be inserted into the bearing.

As the seal continues to pass through the tool on its path the seal encounters a 3rd stage 140 of the evolutive guide. Here, the lower lips 77 of the seal are mostly folded or compressed together and are coming down into the bearing.

As the seal continues to pass through the tool the seal encounters a flattening edge 150 of the evolutive guide. Here, the lower lips 77 of the seal are completely folded and are coming down and being inserted into the bearing. Accordingly, the seal is formed into the shape of a Y.

Finally, as the seal completely passes through the tool the two lower lips 77 are able to recover into their initial shape opened outward.

It may be necessary to adjust the width of the tool for H-Seals of different sizes. The present invention provides a simple way to do so. Upon assembly, the first and second cam levers are tightened such that the first and second springs 34, 44 compress and provide an outward force that opposes the tightening. The opposing spring force keeps the male and female connecting assemblies pushed apart from each other.

Therefore the insertion tool can be adjusted by turning the first and second cam levers in a clockwise or counterclockwise direction to either make the tool wider or thinner in order to match the horizontal width of the chosen H-seal to be inserted and the internal spacing of the inner and outer rings of the bearing. As such, the opposing force created by the springs also prevents sloppiness when adjusting the interconnecting assemblies.

Figure 7:
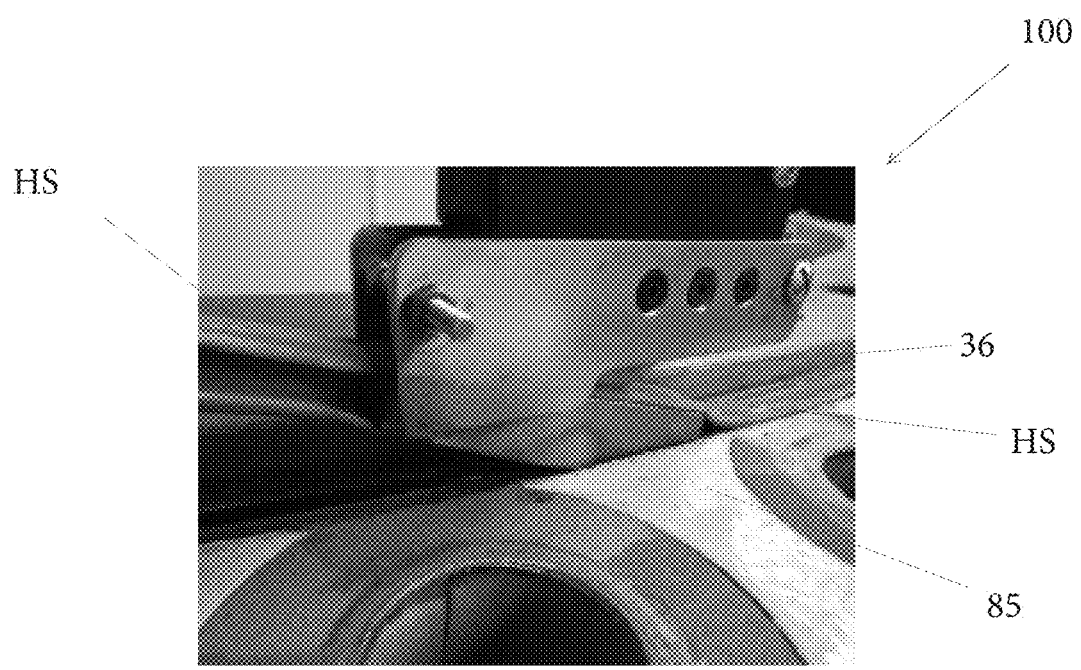
FIG. 7 shows a perspective view of the insertion tool inserting the H-seal into the bearing according to the present invention.

Finally, upon insertion of the H-Seal, an optimal position of the roller with respect to horizontal is tangent to the top of the H-Seal as illustrated in FIG. 7. The seal is inserted in the gap between the inner and the outer rings of the bearing. The bearing may provide a slewing bearing as shown.

A gap between the sliding pads can be optimized by further adjusting the position of the sliding pads to help an insertion zipper effect with a low friction. The sliding pads 18, 20 are configured move along grooves 53, 54 positioned in the male and female interconnecting assemblies 14, 16 respectively. In order to accomplish the sliding action, flat head countersunk (FHc) screws 52 are inserted through holes 55 disposed in the sliding pads 18, 20 and then through the grooves 53, 54 in the male and female interconnecting assemblies 14, 16 respectively. The screws are then screwed into a series of lock nuts 57 disposed on the inside of the male and female interconnection portions 14, 16, thus enabling accurate adjustment of the pads.

As such, the FHc screws may be loosened and to adjust the evolutive guides to slide forward with respect to the center of the insertion tool to adjust compression of the lower lips of the H-Seal. Alternately, the FHc screws may be loosened to adjust the evolutive guides backward away from the center of the insertion tool to adjust compression of the lower lips of the H-Seal.

Figure 8:
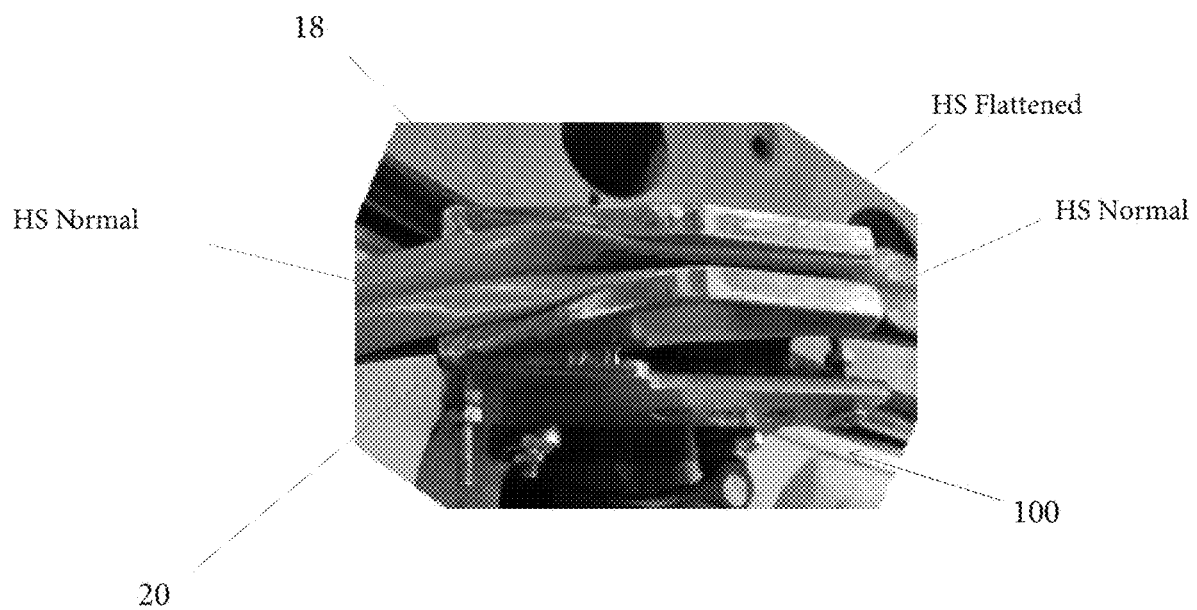
FIG. 8 shows a perspective view of the insertion tool and H-Seal turned upside down according to the present invention.

This allows the tool to be accurately adjusted when the seal is inserted in the slide channel of the bearing in order to keep the seal in an Y shape by forming the two lower lips close together. FIG. 8 shows the Y shape of the seal as the lips are compressed together (shown inverted). Once a correct fit is obtained between the tool, slot and seal, the screws are retightened and locked in place.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A tool for inserting an H-Seal into a bearing, the H-Seal having two upper lips, two lower lips and a vertical flange positioned therebetween that connects the upper and lower lips together, the bearing having inner and outer rings and a gap therebetween, the tool comprising:

a vertical part assembly having a top portion, a bottom portion, and a freely rolling disc, the top portion having right and left side portions, a first interconnecting portion configured to engage a second interconnecting portion, the first interconnecting portion configured to receive the vertical part assembly through an opening in the first interconnecting portion that compliments the shape of the top and bottom portions of the vertical part assembly, a gripping element connected to the top portion of the vertical part assembly body, the rolling disk providing a cylindrical hole positioned about a center axis, the rolling disc mounted to the bottom portion of the vertical part assembly and fixed through the annular hole to the bottom end of the vertical part assembly, first and second sliding pads connected to the right and left interconnecting portions of vertical part assembly, the first and second sliding pads having first and second evolutive guides that vary in shape from top to bottom and from back to front, wherein the first and second evolutive guides are configured to pass the H-Seal between the stages of being in a free state with the lower lips opened outward, to being pre-inserted into the bearing, to being inserted into the bearing, to coming down into the bearing, to the lower lips opening downward in a vertical position between the inner and outer bearing rings, and finally, the two lower lips being able to recover into their initial shape opened outward.

2. The tool according to claim 1, further comprises an adapter that connects the gripping element to the top portion of the vertical part assembly.

3. The tool according to claim 1, wherein the rolling disc is one of riveted or pinned to the cylindrical hole in the bottom end of the vertical part assembly.

4. The tool according to claim 1, wherein the left and right interconnecting portions of the body are configured to be male and female interconnecting portions respectively.

5. The tool according to claim 4, further comprising a male interconnecting assembly including a first lever having a threaded end, a first spring, a first locating pin, and the male interconnecting portion that provides at least one threaded hole and at least one clearance hole disposed therein, and a female interconnecting assembly including a second lever having a threaded end, a second spring, a second locating pin, and the female interconnecting portion providing at least one threaded hole and at least one clearance hole disposed therein, wherein the first locating pin is fixed to the male interconnecting assembly and the second locating pin is fixed to female interconnecting assembly, wherein the male and female interconnecting assemblies are assembled together such that the first locating pin projects and is guided into one of the at least one clearance holes in the female interconnecting assembly and the second locating pin projects and is guided into one of the at least one clearance holes disposed within the male interconnecting assembly, and wherein the first lever extends through one of the at least one clearance holes in the male interconnecting assembly and screws into one of the at least one threaded holes in the female interconnecting assembly and the second lever extends through one of the at least one clearance holes in the female interconnecting assembly and screws into one of the at least one threaded holes in the male interconnecting assembly.

6. The tool according to claim 5, wherein the first spring is positioned within one of the at least one clearance holes disposed within the male interconnecting assembly, wherein the second spring is positioned within one of the at least one clearance holes disposed within the female interconnecting assembly, and wherein as the first lever and second levers are further tightened into one of the at least one threaded holes in the male and/or female interconnecting assemblies respectively, the first and second springs compress and provide a force that opposes the tightening.

7. The tool according to claim 5, wherein the tool is adjustable in order to insert the seal in a slide channel of the bearing in order to keep the seal in an Y shape by forming the two lower lips close together.

8. The tool according to claim 1, wherein upon insertion of the H-Seal, an optimal position of the roller with respect to horizontal is tangent to the top of the H-Seal.

9. The tool according to claim 1, wherein the seal is inserted in the gap between the inner and the outer rings of the bearing, and wherein the gap between the sliding pads is optimized to help an insertion zipper effect with a low friction.

10. The tool according to claim 1, wherein the sliding pads move in a groove that enables adjustment of their position forward or backward with respect to a center of the tool.

* * * * *